M. J. PIGNARRE.
MOLDING APPARATUS.
APPLICATION FILED MAR. 8, 1907.
926,893.
Patented July 6, 1909.
4 SHEETS—SHEET 1.
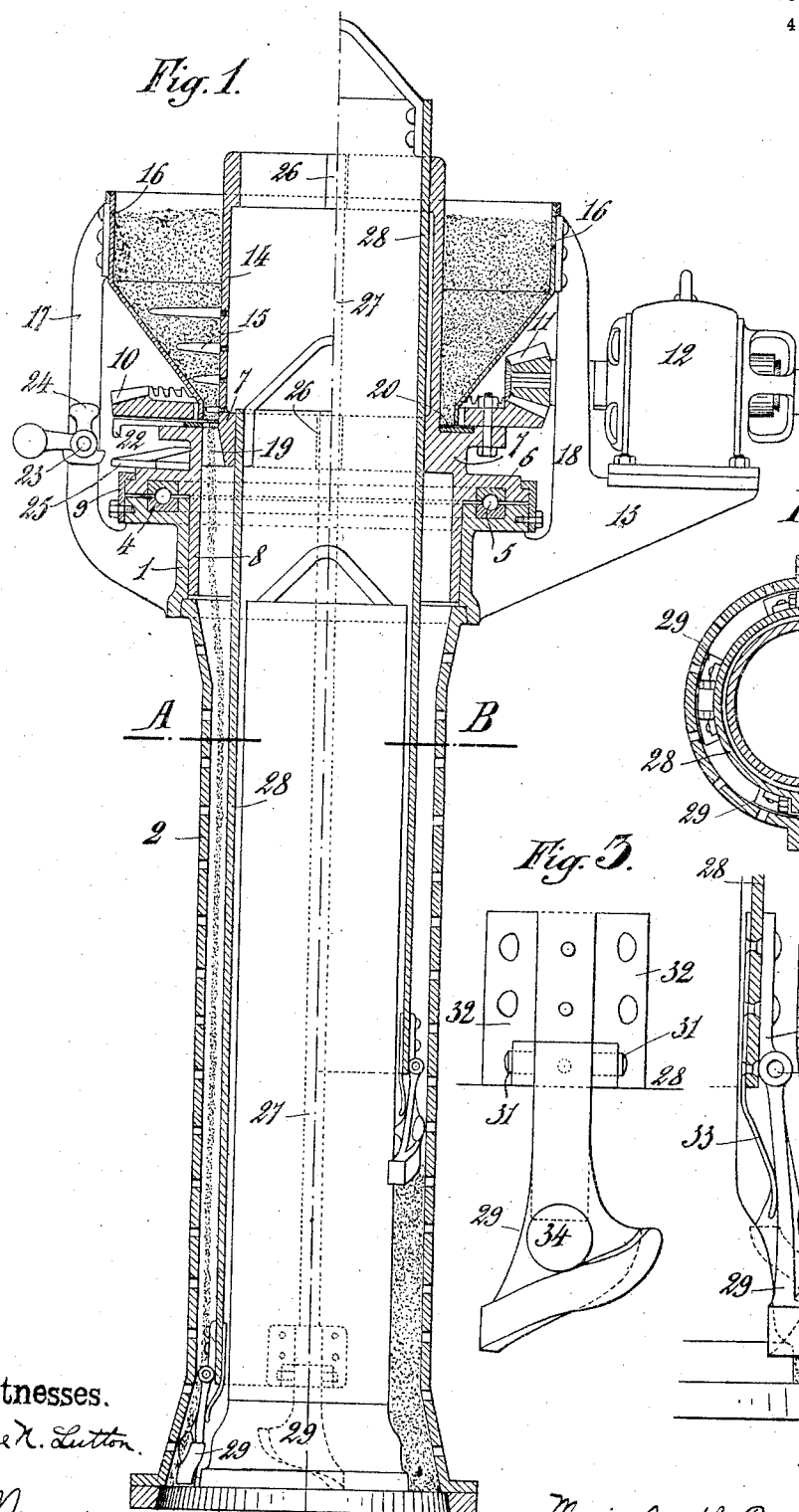
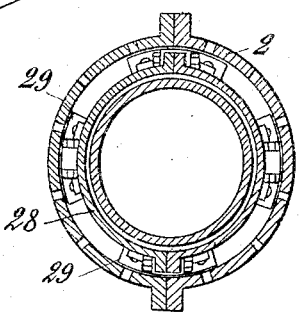
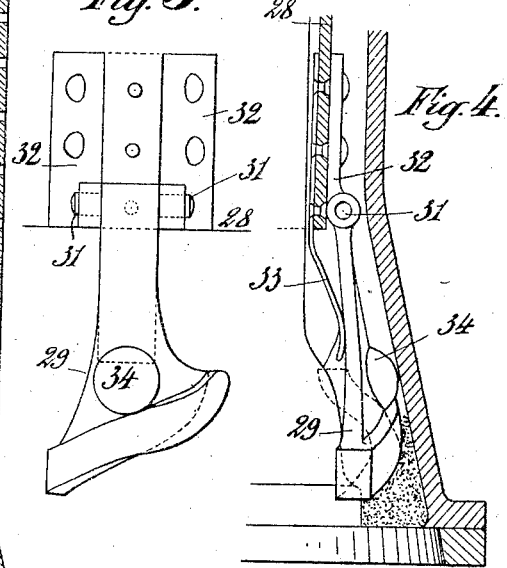
Witnesses.
Jesse N. Lutton
B. Sommers
Inventor.
Marie Joseph Pignarre
by Henry Orth Jr.
Atty.
ANDREW. B. GRAHAM CO., PHOTO-LITHOGRAPHERS, WASHINGTON, D. C.

M. J. PIGNARRE.
MOLDING APPARATUS.
APPLICATION FILED MAR. 8, 1907.
926,893.
Patented July 6, 1909.
4 SHEETS—SHEET 2.
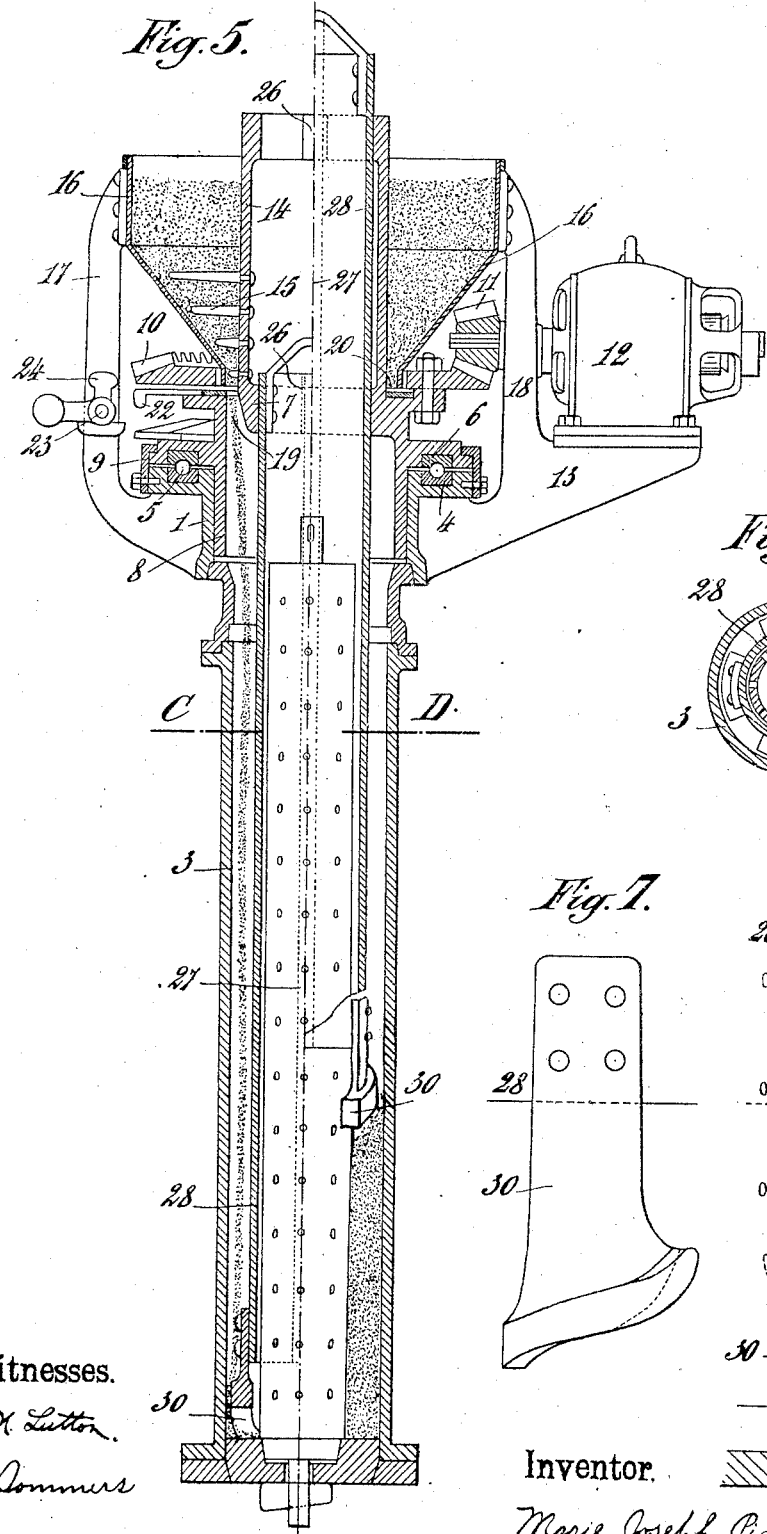
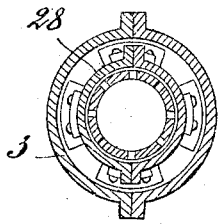
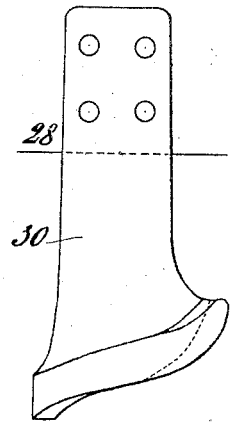
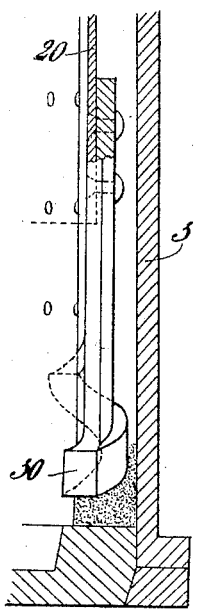
Witnesses.
Inventor.
Marie Joseph Pignarre
by Henry Orth Jr.
Atty.

M. J. PIGNARRE.
MOLDING APPARATUS.
APPLICATION FILED MAR. 8, 1907.

926,893.

Patented July 6, 1909.
4 SHEETS—SHEET 3.

Witnesses.
Jesse N. Lutton.

Inventor.
Marie Joseph Pignarre.
by Henry Orth
Atty.

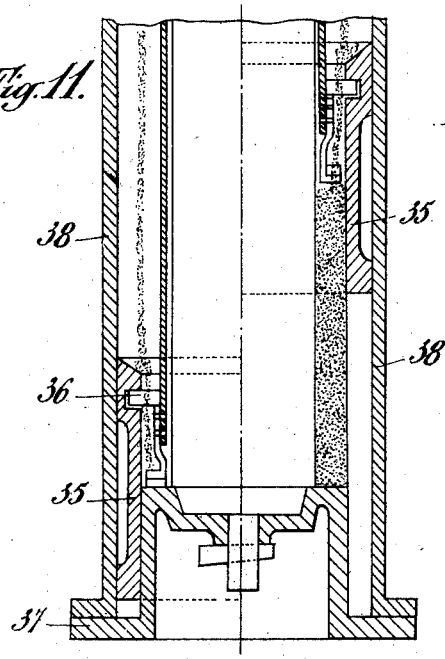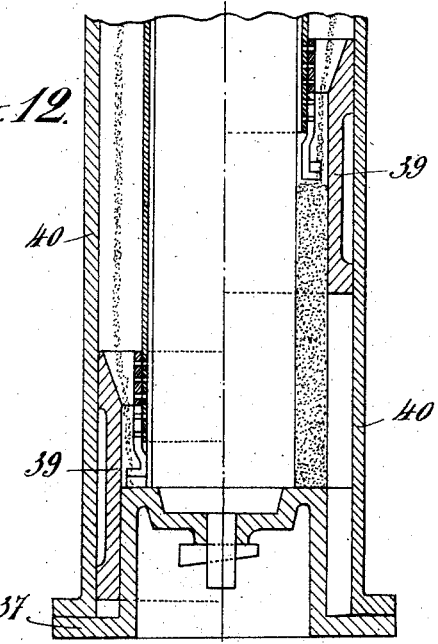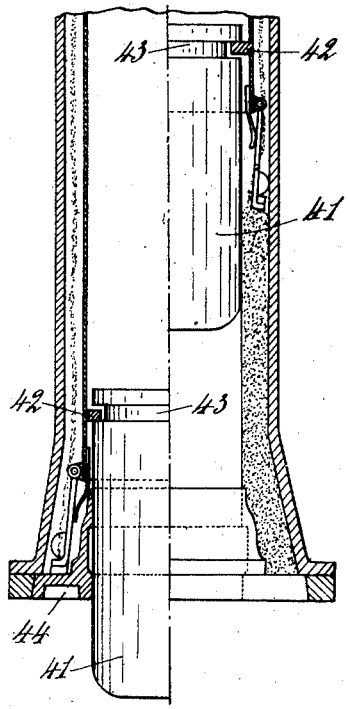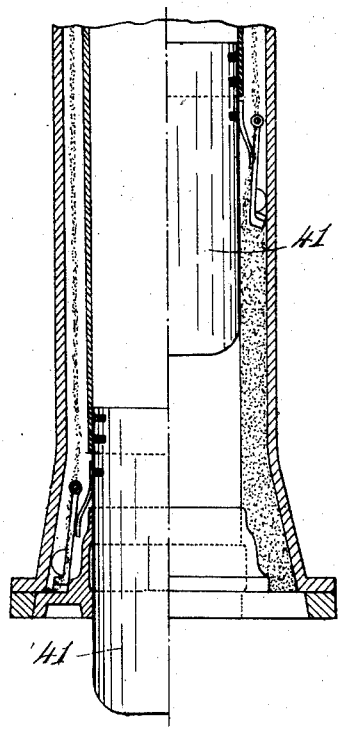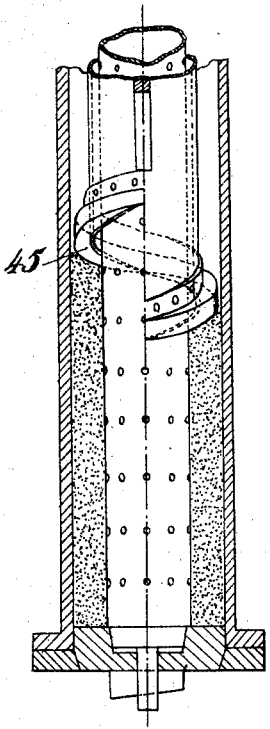

UNITED STATES PATENT OFFICE.

MARIE JOSEPH PIGNARRE, OF LIEGE, BELGIUM.

MOLDING APPARATUS.

No. 926,893.　　　　Specification of Letters Patent.　　　　Patented July 6, 1909.

Application filed March 8, 1907. Serial No. 361,402.

*To all whom it may concern:*

Be it known that I, MARIE JOSEPH PIG-NARRE, a subject of the King of Belgium, residing at Liege, Belgium, have invented certain new and useful Improvements in Molding Apparatus; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to an apparatus for the preparation of sand molds and cores for cylindrical and similar castings. In such device it is essential to provide a mold or a core perfectly straight, all parts of which are quite concentric with one another and at the same time to provide for a complete homogeneity in the compression of sand in all parts of the mold or core.

The object of this invention is to use models and core boxes of shape and size exactly the same as those of the molds and cores to be prepared, together with a tubular compressor holder revolving horizontally around the model or lantern which it surrounds, said compressor holder pressing the sand only by its own weight and rising along the fixed model or lantern, by means of the screw shaped under face of compressors, rising and pressing on the sand automatically fed there before.

The object of this invention is to dispense with models of reduced length, following the rising movement of the compressors and with the alternating axial movement which such compressors usually receive, which constructions produce irregular results.

The following description has reference to the appended drawings, wherein like numbers of reference refer to like parts in all figures, and wherein—

Figure 9:
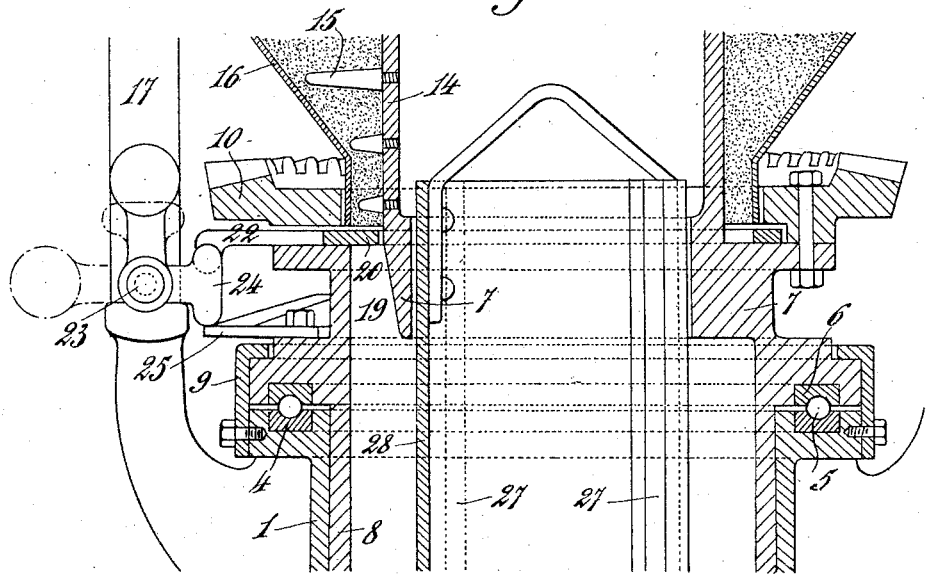
Figure 10:
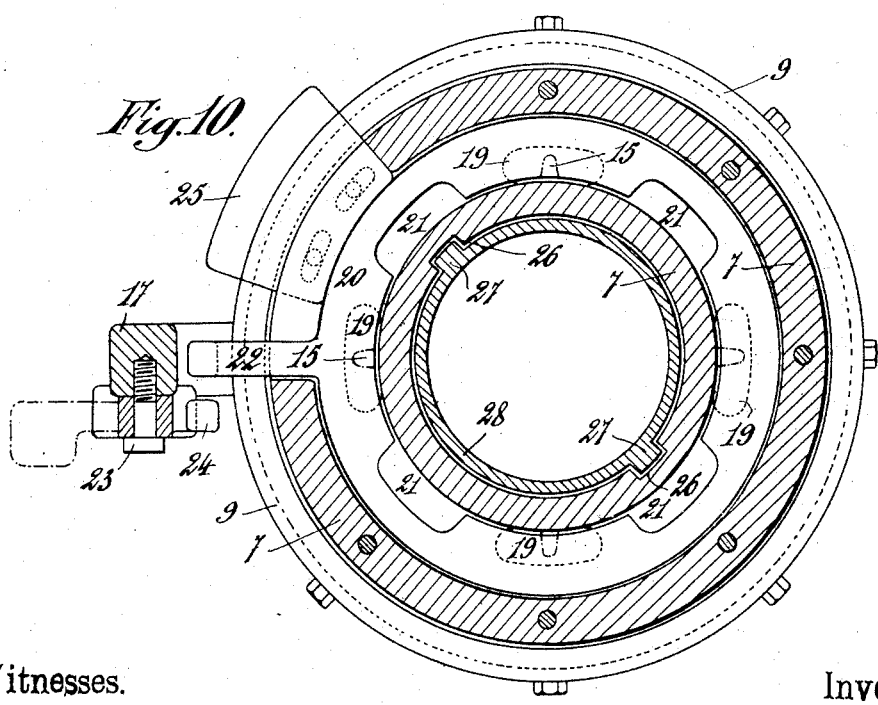

Figure 1 is a cross sectional elevation showing the apparatus mounted on a vertical frame wherein the model of the tube to be molded is centered the socket end downward, the half section on the left showing a compressor holder in its extreme lowermost position, beginning to press the sand around the socket of the tube, and the other half section showing the tubular compressor holder pressing the sand around the body of tube. Fig. 2 is a cross sectional plan of the frame, the tubular compressor holder and the model on A B Fig. 1. Figs. 3 and 4 are front and side elevations of a compressor hinged on the tubular compressor holder with its hinges, spring and screw shaped under face which is raised in front. Fig. 5 is a cross sectional elevation showing the apparatus mounted on a vertical core box wherein the lantern is centered; the half section on the left shows the tubular compressor holder in its extreme lowermost position, the other half section shows the tubular compressor holder having already pressed part of the core. Fig. 6 is a cross sectional plan through the core box, the tubular compressor holder and the lantern on C D Fig. 5. Figs. 7 and 8 are front and side elevations of a compressor rigidly connected to the tubular compressor holder, its screw shaped under face being raised in front. Fig. 9 is a cross sectional elevation of the under part of the sand hopper, feeding openings, valves and means for automatically opening the feeding apertures. Fig. 10 is a cross sectional plan showing the feeding openings, valves and means for automatically opening the feeding apertures. Fig. 11 is a cross sectional elevation of a core box of reduced length hanging at the lower end of the tubular compressor holder and receiving the same rising movement. Fig. 12 is a cross sectional elevation of a core box of reduced length hanging at the lower end of the tubular compressor holder and receiving the same movement. Fig. 13 is a cross sectional elevation of the lower part of a frame with a model of reduced length connected to the tubular compressor holder by means of a crown engaging a circular groove. Fig. 14 is a cross sectional elevation of the lower part of a frame with a model of reduced length connected to the tubular compressor holder. Fig. 15 is a cross sectional elevation of a core box showing a tube surrounding the lantern and provided with a screw shaped compressor.

As shown in the drawings, the device consists of a frame 1 mounted on a casing 2 or core box 3. The upper end of said frame carries the lower part 4 of a ball bearing 5, which carries the upper part 5 thereof fixed on a sleeve 7. Said sleeve 7 is guided in frame 1 by a downward tubular extension 8. The frame 1 and sleeve 7 are longitudinally connected together by a ring 9 fixed on the upper end of frame 1. On the sleeve 7 is fixed a toothed crown 10 engaging with a pinion 11 actuated by an electric motor 12 carried on a bracket 13 of frame 1. The sleeve 7 bears another upward tubular extension 14 of sufficient height to guide the tubular compressor holder and hold it in a vertical position during the molding. Said tubular prolongation 14 constitutes the inner wall of the sand hopper whereon spindles 15 are fixed. The outer wall 16 of said hopper is fixed on posts 17, 18 forming part of frame 1. The sleeve 7 constitutes the bottom of said sand hopper and is provided with feeding openings 19. Said openings can be closed by a circular valve 20 bearing notches 21 and a handle 22. On post 17 is mounted on a stud 23 an abutment 24 to automatically open the feeding openings on starting the apparatus. A finger 25 on sleeve 7 rotates the abutment 24 when the feeding openings are opened to the required extent.

In the sleeve and in its tubular extension 14 are longitudinal grooves 26 engaged by a longitudinal rib 27 on the tubular compressor holder 28. On the lower end of said tubular compressor holder 28 are mounted articulated compressors 29, rigid compressors 30 or a screw as shown in Fig. 15. The compressors 29 are pivoted to the tubular compressor holder to allow of molding around the projecting parts of models or cores (as sleeves, rims of tubes) without being obliged to increase the thickness of sand on the body part of the mold at those places; they are pivoted on studs 31 in the hinges 32 connected to the compressor holders. A spring 33 presses them always by their spherical boss 34 against the wall of the casing or core box. Compressor 30 is rigidly mounted on said tubular compressor holder for molds or cores with uniform section. The screw 45 on Fig. 15 is rigidly mounted at the lower end of the tubular compressor holder for molds or cores with uniform section. The under faces of compressors 29 and 30 are screw shaped and raised at their front ends to rise easily on the sand. They are curved according to the outer face of models and lanterns. Said apparatus are movable or fixed respectively when the frame or core boxes are movable or fixed. In either case, to prepare a mold or a core the frame 1 is fixed on the casing or core box wherein the model or lantern is already centered. The tubular compressor holder is lowered until the compressors rest on the bottom of the mold or of the core box.

The hopper contains sand and the feeding openings are closed. The abutment 24 is in the position shown in full lines Figs. 9 and 10. The motor is started. The toothed crown 10 is rotated horizontally together with the sleeve 7 forming part therewith. The tubular compressor holder is rotated therewith by the longitudinal rib 27 engaging the groove 26 of the sleeve. The inner wall of the hopper and its bottom provided with feeding openings also revolve with the compressor holder. The outer wall 16 of the hopper does not revolve. On starting the handle 22 of valve 20 engages the pivoted abutment 24, the valve stops until the finger 25 lifts said abutment 24, which trips and comes into the position shown in punctuated line Figs. 9 and 10. At this moment the notches 21 of the valve come in front of the feeding openings 19 which are discovered to the required extent and the valve begins again to revolve with the bottom of the hopper. As soon as the openings are uncovered the sand stirred by the spindles 15 is distributed in the mold or in the core box continuously and during the revolution of the compressors which press it by their screw shaped under face as it falls before them. The tubular compressor holder 28 rises along the fixed model or lantern by means of the screw shaped underfaces of the compressors and slides in the sleeve 7 and its tubular extension 14. When the mold or core is finished, the motor is stopped and the feeding openings closed.

To prepare molds it is sometimes preferred in some particular instances to use a model of reduced length receiving only a rising movement like the compressors or both rising and revolving movements.

In Fig. 13 the model 41 is of reduced length. It is hung at the lower part of the tubular compressor holder by means of a crown 42 engaging a groove 43. The model of reduced length is centered at the upper part in the socket model 44, it rises with the tubular compressor holder. The compressors are pivoted at the lower end of the tubular compressor holder to press the sand around the socket model.

In Fig. 14 the model 41 is of reduced length. It is mounted on said tubular compressor holder. The model of reduced length is centered in the socket model, revolves and rises with the tubular compressor holder. The compressors are pivoted on the lower end of the tubular compressor holder. To prepare cores it is preferred in some particular instances, in order to prepare a small number of articles having the same diameter, to use core boxes of reduced length receiving only the upward movement of compressors or both their upward and revolving movements.

In Fig. 11 the core box 35 is of reduced length. It is hung at the lower part of the tubular compressor holder by means of lugs 36 and is centered on a fixed base 37. The box does not revolve with the compressors but is moved vertically thereby. It is guided by a casing 38 which also carries sand under the compressors.

In Fig. 12 the reduced core box 39 forms part of the tubular compressor holder, it revolves and rises therewith, guided by casing 40 which carries sand under the compressors.

In Figs. 11 and 12 the upper part of the apparatus is the same as in Figs. 1, 5, 9 and 10.

Without departing from the scope of this invention sand molds or cores may be prepared by leaving tubular compressor holders and sleeve fixed and by rotating the casing or core box with the frame and the outer wall of the sand hopper.

Claims:—

1. In a device for the preparation of molds for cylindrical castings, in combination, a frame, a model a tubular compressor holder, compressors mounted on the holder, a sand hopper surrounding the tubular compressor holder, a slidable connection between the hopper and compressor holder, stirring spindles on one wall of the hopper and the bottom of which hopper is provided with feeding openings, and means to horizontally rotate one of the hopper walls.

2. In a device for the preparation of sand molds for cylindrical castings, the combination with a core box and a core, of a vertically movable compressor holder, compressors pivotally mounted on the end of the holder and means to urge the compressors against the core box, whereby said compressors automatically accommodate themselves to varying diameters of the mold.

3. In a device for the preparation of sand molds for cylindrical and similar castings, the combination with a core box, a frame mounted thereon and a core, of a sand hopper having an outer stationary wall on said frame and an inner revoluble wall and a bottom movable with said inner wall having sand feed openings therein, a valve to control said openings, a compressor holder connected to and longitudinally slidable with respect to the inner wall of the hopper and surrounding the core, compressors mounted on the end of the holder, means to rotate the inner hopper wall and means to automatically control the valve by the movement of said inner wall.

In testimony that I claim the foregoing as my invention, I have signed my name in presence of two subscribing witnesses.

MARIE JOSEPH PIGNARRE.

Witnesses:
GEORGES VANDER HAUGHEN,
MAURICE BENOIT.